(12) United States Patent
Dyke et al.

(10) Patent No.: US 8,937,623 B2
(45) Date of Patent: Jan. 20, 2015

(54) PAGE FLIPPING WITH BACKEND SCALING AT HIGH RESOLUTIONS

(71) Applicant: Apple Inc., Cupertino, CA (US)

(72) Inventors: Kenneth C. Dyke, Cupertino, CA (US); Christopher Wright, Cupertino, CA (US); Chad E. Jones, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 13/652,233

(22) Filed: Oct. 15, 2012

(65) Prior Publication Data

US 2014/0104283 A1    Apr. 17, 2014

(51) Int. Cl.
*G09G 5/36* (2006.01)
*G09G 5/00* (2006.01)

(52) U.S. Cl.
USPC ............................................ 345/545; 345/1.1

(58) Field of Classification Search
CPC ............. G09G 5/00–5/008; G09G 5/36–5/366
USPC .................................................. 345/1.1, 545
See application file for complete search history.

(56) References Cited

U.S. PATENT DOCUMENTS

| 7,184,442 B1 | 2/2007 | Roos |
| 7,224,731 B2 | 5/2007 | Mehrotra |
| 7,425,962 B2 | 9/2008 | Alcorn et al. |
| 7,586,492 B2 | 9/2009 | Riach et al. |
| 8,514,942 B2 * | 8/2013 | Goel ......................... 375/240.21 |
| 2005/0195206 A1 | 9/2005 | Wogsberg |

* cited by examiner

*Primary Examiner* — Jacinta M Crawford
(74) *Attorney, Agent, or Firm* — Kenyon & Kenyon, LLP

(57) ABSTRACT

A logical framebuffer may identify pixels areas or blocks of an image that have changed between successive frames. The pixel values of these identified areas may be copied and/or scaled from more recent frames and merged into older frames stored in scanout buffers of an image display system to update older buffers. The logical framebuffer may compare image data at a resolution that is greater than or equal to the resolution of the scanout buffers. Scaling may be used to downscale changed pixel areas frames stored at the higher resolution of logical framebuffer that are to be copied into older frames at the lower resolution of the scanout buffers to update the older frames. Changed pixel areas may also be copied from a newer frame buffered at the lower resolution after the older frame. Latency may be reduced. Image processors, display systems, and methods are provided.

20 Claims, 5 Drawing Sheets

PAGE FLIPPING WITH BACKEND SCALING AT HIGH RESOLUTIONS

BACKGROUND

Computing systems may contain multiple buffers for storing video data that is used to display images on a screen. For example, some computers use page flipping and/or triple buffering to display quickly images on a screen. In page flipping, video data is stored in separate buffers. At any given moment, video data may be inputted (or written) to a first buffer and outputted (or read) from a second buffer to display an image on the screen. Once the data from the second buffer has been outputted to the screen, the roles of each buffer reverse—new video data may be written to the second buffer while the video data previously written to the first buffer may be read and displayed on the screen.

FIG. 1 shows how page flipping with three scanout buffers was used to display image data on one or more display screens. A graphic processor included a set of scanout buffers 1 to 3. Each set of scanout buffers was configured to support a different video resolution. For example, a first set of buffers 10 was configured to support a first resolution X of a first and a second display screen 17 and 18. A second set of buffers 11 was configured to support a second resolution Y of a third display screen 19. The second set of buffers 11 was provided to support an option for outputting a video signal to an additional display device at a different resolution than the first display supported by the first set of buffers 10.

In the prior art, the scanout buffers 1 to 3 were each used to store display data which was then outputted to display screen 17. Each of the buffers 1 to 3 contained frame data from successive image frames at resolution X for buffer set 10 and resolution Y for buffer set 11. At about time t1, the frame A data from buffer 1 would be read out to display screen 17. Once the frame A data was read out from buffer 1, the frame B data would be read out from buffer 2 at about time t2, and the process would continue reading out the next buffered frame data at about each subsequent time interval. Once the data was read out from a buffer, such as the frame A data from buffer 1, the frame A data would be updated with new data, in this case frame D data at the resolution X for buffer set 10 and resolution Y for buffer set 11, representing a next frame in the sequence to be buffered. Thus, the same frame data would be separately maintained at different resolutions for each set of buffers 10 and 11 at different resolutions. In some instances in the past, the frame A data would be overwritten by frame D data in each of the buffer sets 10 and 11 at the respective resolutions to update each buffer 1 with data from new frame D at the different resolutions.

This process repeated continuously. For example, after the frame B data had been read out from buffer 2, the frame B data in buffer 2 would be updated with frame E data representing a next frame in the sequence to be buffered.

Some newer displays have high pixel densities supporting higher resolutions. To use the higher resolutions, the frame data must include additional pixel information for the additional pixels included as part of the high pixel densities. Including this additional pixel information in frame data results in longer reading and writing times into each of the buffers. This may result in increased image display latency that computer users would find undesirable.

Additionally, different displays may support different resolutions. In the past, when two or more displays with different resolutions were in use, the image data for each display would be separately buffered at each resolution. Maintaining multiple separate sets of buffers at higher resolutions may require the use of additional resources and also result in increased latency. These latency effects may result in increased delay from when a user moves the mouse or types a key until the movement or key press is depicted on the screen.

There is a need for fast buffering of high resolution frame data that reduces the undesirable latency associated with buffering additional pixel information for one or more high resolution displays operating a different resolutions.

DETAILED DESCRIPTION

Image frame data may buffered before being outputted to a display. A separate set of buffers may be provided for each unique display output resolution when simultaneous display output signals at different resolutions are needed. The image frame data in each set of buffers may be stored at the unique display output signal resolution. New image frame data that is to be buffered before being outputted to display or other output destination may be initially received and processed at a maximum supported resolution by a logical framebuffer.

The logical framebuffer may compare the new image frame data to previously buffered image frame data in order to identify pixel areas that have changed in the new image frame data. A scaler may then downscale the changed pixel areas in the new image frame data from the maximum supported resolution to the respective unique resolution associated with each the separate buffer sets when the unique resolution of a buffer set is less than the maximum supported resolution. Each of the downscaled changed pixel areas may then be copied into the previously buffered image frame data to update the buffered data with the newest image frame data.

In some instances, page flipping between multiple buffers may be used to reduce latency. In these instances, once a buffer containing the oldest image frame data has been outputted to a display, the oldest image frame data may be updated with the newest pixel area data changes as reflected in the newer and/or newest image frame data. Overall latency may be minimized as a result.

Figure 1:
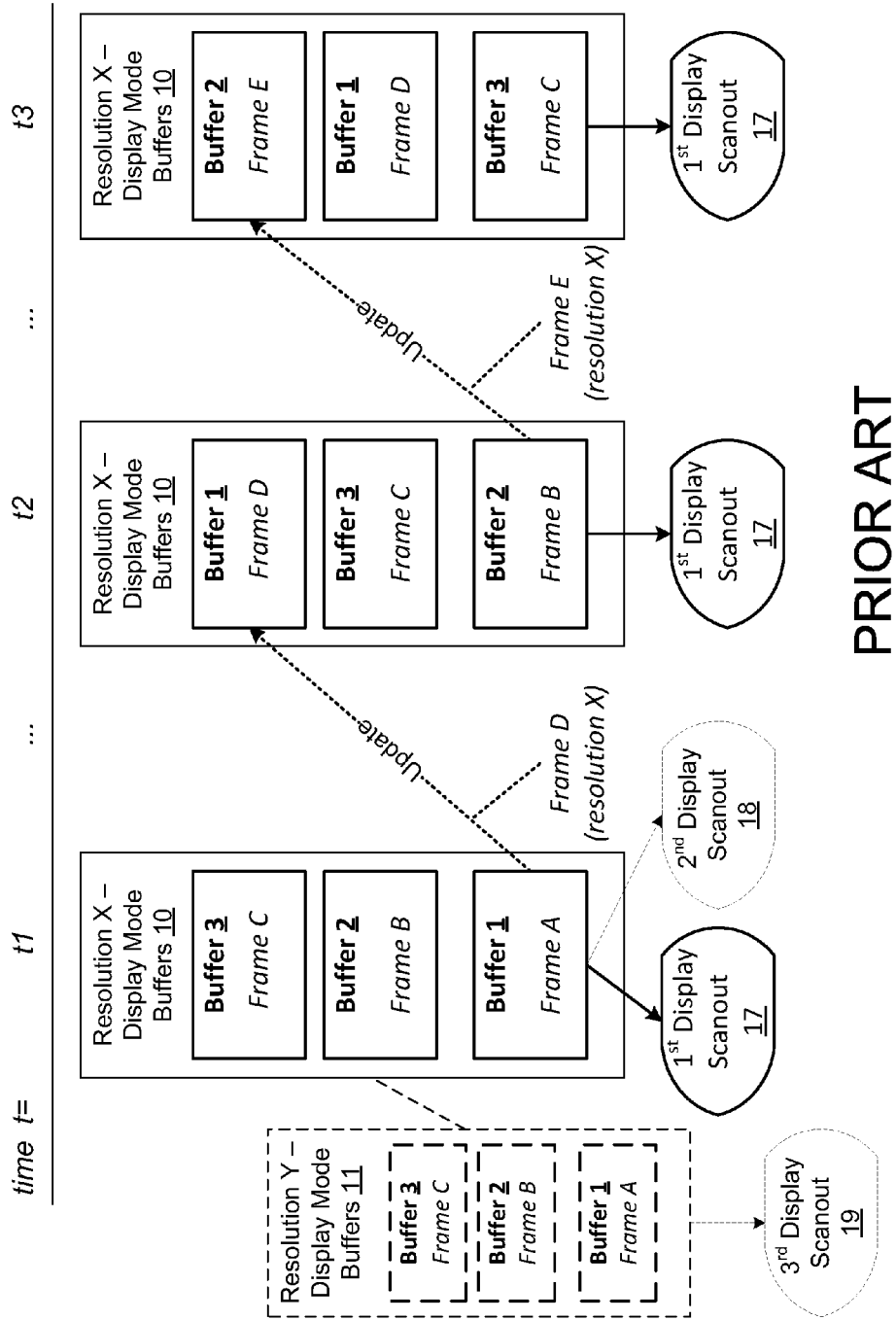
FIG. 1 shows exemplary buffering of video frame data through three scanout buffers in the prior art.
Figure 2:
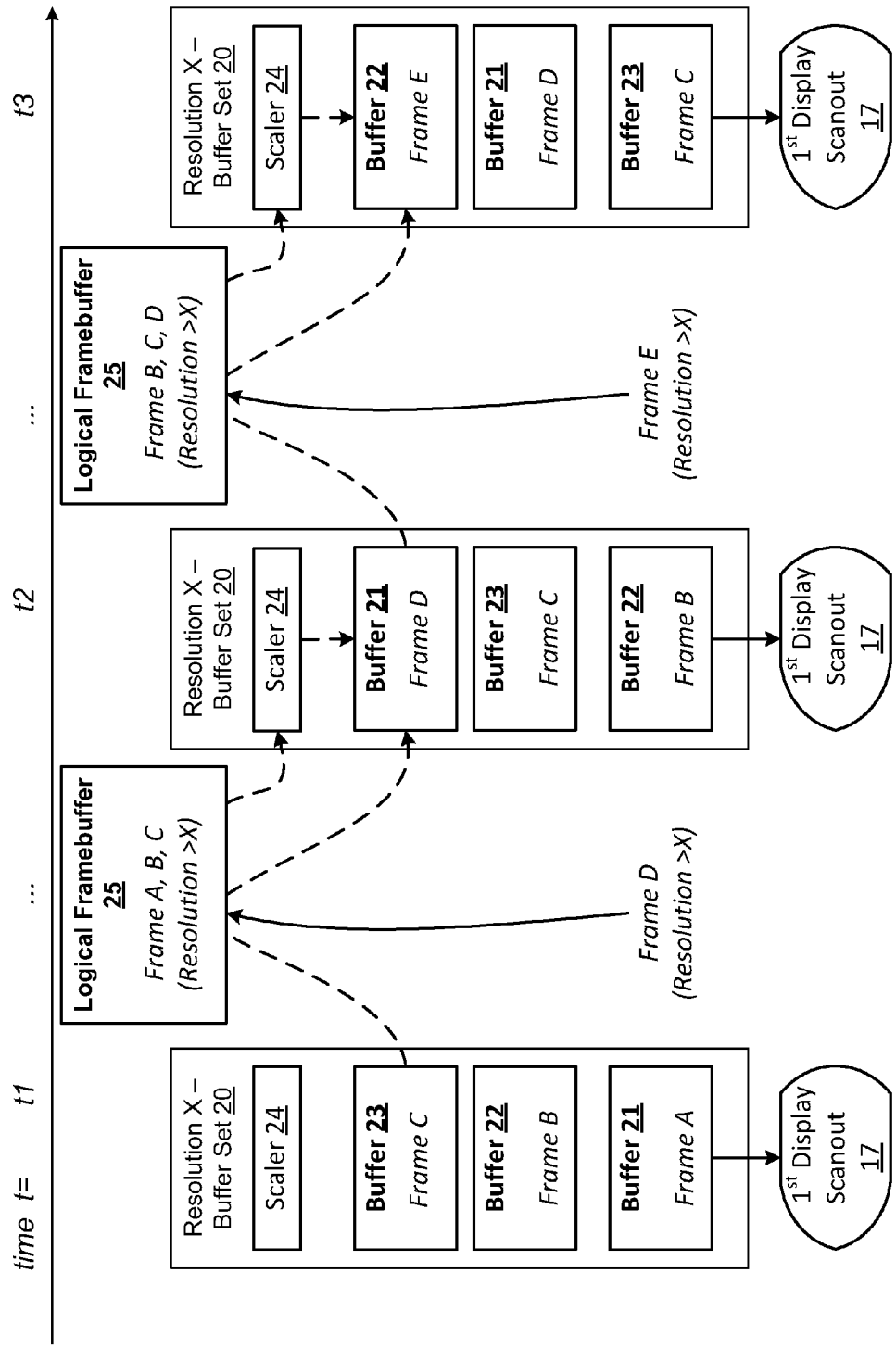
FIG. 2 shows an exemplary embodiment of the invention for reducing a display latency of high resolution frame data.

FIG. 2 shows an exemplary use of a logical framebuffer 25 in an embodiment of the invention. This embodiment includes a first buffer set 20 storing image frame data at resolution X with three buffers 21 to 23 and a scaler 24. In other embodiments different numbers of buffers may be used and scaler 24 need not be included in the buffer set 20. The three buffers 21 to 23 may be configured to store image frame data at resolution X, while the logical framebuffer 25 may be configured to process image frame data at resolution greater than X. Frames A to E may represent the pixel data associated with five consecutive image frames to be displayed on the screen.

In this example, at time t1, the three buffers 21, 22, and 23 in buffer set 20 may contain image frame data corresponding to respective image frame A, B, and C. The image frames A, B, and C may be stored at resolution X in respective buffers 21, 22, and 23. At or about time t1, the oldest image frame data from frame A in buffer 21 may be read out and sent to a first display 17 at resolution X.

Figure 3:
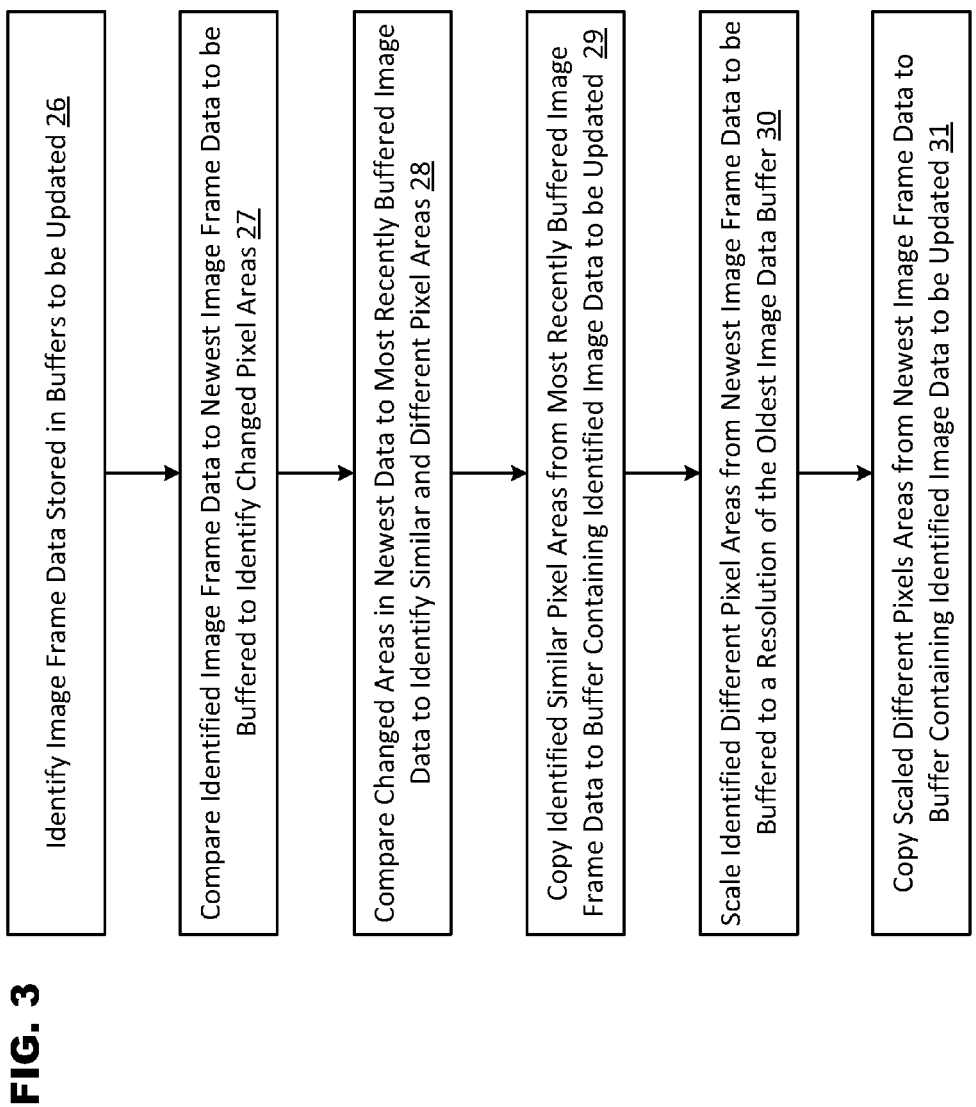
FIG. 3 shows an exemplary method in an embodiment of the invention.

Between times t1 and t2, the buffers 21 to 23 may be page flipped so that the frame B contents of buffer 22 will be read out to the display 17 at or around time t2. The contents of buffer 21 may then updated with more recent image frame data. The logical framebuffer 25 may compare the existing frame A data in buffer 21 to the most recently buffered frame C data in buffer 23 and the newest frame D data to be buffered in order to update the frame A data in buffer 21 to the frame D data. FIG. 3 shows an exemplary method by the which the framebuffer 25 may update the image data in buffer 21.

In box 26, the logical framebuffer 25 may identify image frame data stored in buffers that is to be updated. In some instances, the oldest image frame data, such as the image frame data stored in the buffers the longest or associated with an oldest date, may be identified as the image frame data to be update. In other instances, image frame data that is read out to a display or other output may be identified as the image frame data to be updated. Other criteria may also be used in different embodiments for identifying the image frame data to be updated. In the example shown in FIG. 2, the frame A data is identified as the data to be updated.

Once the image frame data to be updated has been identified, in box 27, the identified image frame data may be compared to a newest image frame data that is to be buffered. The logical framebuffer 36, which may process image frame data at a higher resolution that the image frame data stored in one or more buffer sets 20, may store copies of the higher resolution image frames for comparison and analysis purposes. In the example shown in FIG. 2, the newest image frame data to be buffered is the frame D data. During the comparison, changes to pixel areas between the identified image frame data at the higher resolution as stored in the logical framebuffer 25 and the newest image frame data to be buffered may be identified. In the example shown in FIG. 2, the frame D data stored at the higher resolution in the logical framebuffer 25 may be compared to the frame A data also stored at the higher resolution in the logical framebuffer 25 to identify those pixel areas that have changed between frames A and D. The pixel areas that have changed between these two frames may represent the pixel areas in the identified frame data that should be updated.

In box 28, the changed pixel areas identified in box 27 may be compared to corresponding pixel areas in a most recently buffered image frame. In the example shown in FIG. 2, the most recently buffered image frame is frame C. Thus, in this example, the changed pixel areas identified in box 27 may be compared to corresponding pixels areas of frame C as stored in the logical framebuffer 25 at the higher resolution of the logical framebuffer 25. During the comparison, both similar and different pixel areas may be identified. The similar pixels areas are those pixel areas that haven't changed between the most recently buffered image frame and the newest image frame that is to be buffered. The different pixel areas are those pixel areas that have changed between the most recently buffered image frame and the newest image frame that is to be buffered.

In box 29, the identified similar pixel areas from the comparison in box 28 may be copied from the most recently buffered image frame data to the buffered identified image frame data that is to be updated. In the example shown in FIG. 2, the identified similar pixel areas are the pixel areas that are different between frames A and D but are also identical between frames C and D. These identified similar pixel areas may be copied from the frame C data in buffer 23 to the image frame data in buffer 21.

In box 30, the pixel areas identified as different from the comparison in box 28 may be scaled from the higher resolution of the image frame data stored in the logical framebuffer 25 to the lower resolution of the buffered image data in buffer set 20 when resolution of the image data in the buffer set 20 is less than that of the framebuffer 25. In the example shown in FIG. 2, the identified different pixel areas are the pixel areas that are different between frames A and D, and also different between frames C and D. These identified different pixel areas may be scaled from the higher resolution frame D data stored in the logical framebuffer 25 to the lower resolution of the frame data stored in the buffer set 20.

In box 31, the downscaled pixel areas from box 30 may be copied to the buffered identified image frame data that is to be updated. In those instances where no downscaling is needed, the pixel areas identified as different in box 28 may be copied to buffered identified image frame data without downscaling.

Once this method is complete, the updating of the image frame data in buffer 21 may be complete. In the example shown in FIG. 2, the buffer 21 at time t2 may be updated with the frame D data. This method may be repeated one or more times as needed. Thus, as shown in FIG. 2, at or about time t2, the frame B data in buffer 22 may be read out to display 17. Between times t2 and t3, the buffers 21 to 23 may be page-flipped and/or buffer 22 may be updated with the newest image frame data from frame E by, for example, repeating the method shown in FIG. 3.

Figure 4:
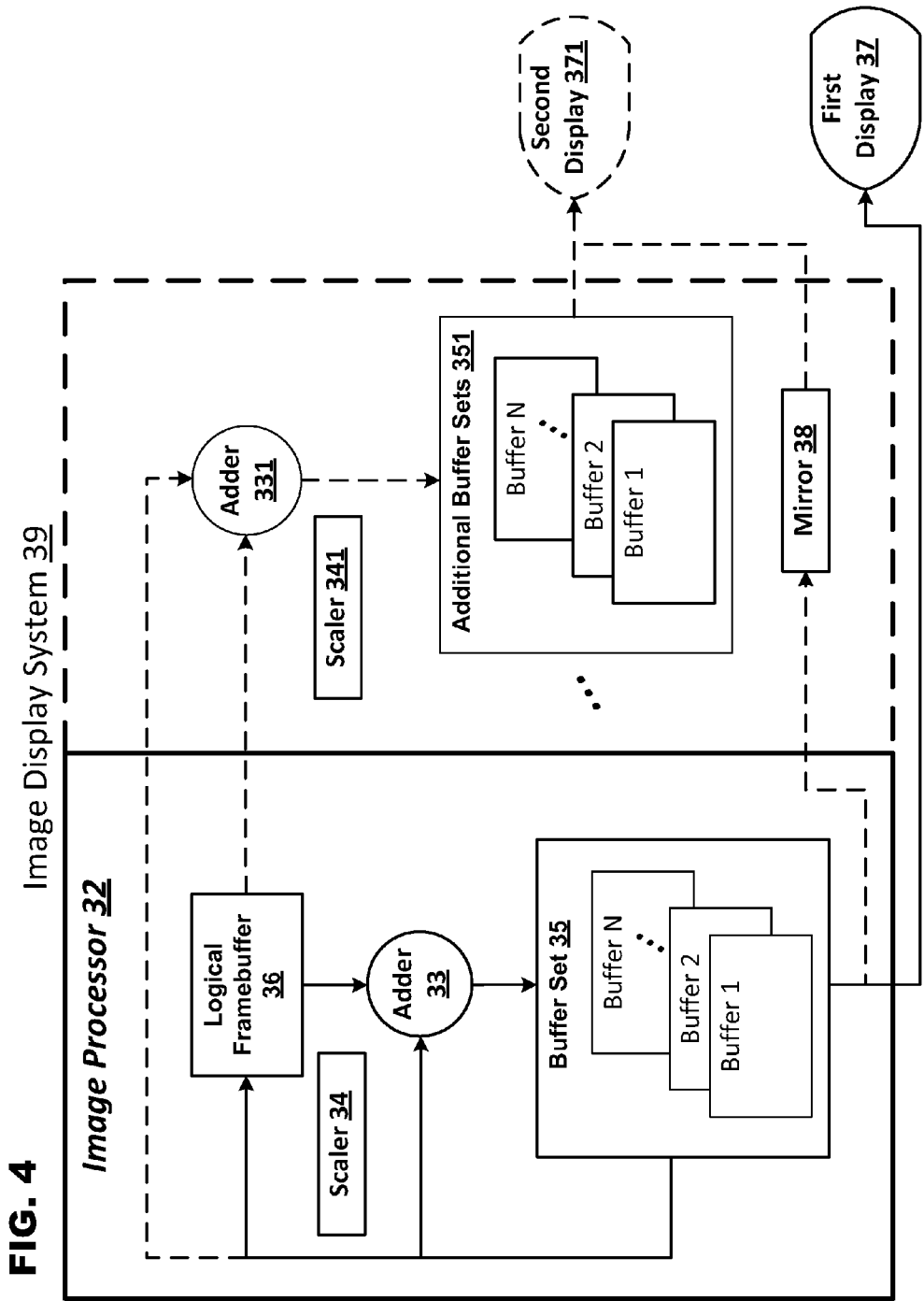
FIG. 4 shows a first exemplary image display system in an embodiment of the invention.

FIG. 4 shows a first exemplary image display system 39 that includes an image processor 32 and one or more devices, such as display devices 37 and/or 371. The image processor 32 may include one or more buffer sets 35 and/or 351. Each buffer set 35 and 351 may include multiple buffers 1 to N. Each buffer 1 to N may store data representing sequential image frames that are to be displayed on the display devices 37 and/or 371. A first of the buffers 1 to N may store most recent image frame data, while a last of the buffers 1 to N may store oldest image frame data outputted to a display device 37 and/or 371. In some instances, each buffer set 35 and 351 may include three buffers 1 to 3, but in other instances, different numbers of buffers may be used.

The image processor 32 may also include a logical framebuffer 36. The logical framebuffer 36 may compare image frame data and update older image frame data according to the methods described herein. The logical framebuffer 36 may include a memory or other storage device for storing image frame data, a processing device for comparing the image frame data, and/or logic for instructing the processing device to compare the image frame data. Processing device may include a single integrated circuit, such as a microprocessing device, microcontroller, central processing unit (CPU), or may include any suitable number of integrated circuit devices and/or circuit boards working in cooperation to accomplish the functions of a processing device.

The image processor 32 may also include an adder 33. The adder 33 may replace the outputted pixels in a non-most recent image frame stored in at least one buffer with corresponding pixel values from the most recent image frame. The adder 33 may replace these pixels before the non-most recent image frame data is outputted to the first display 37. Additional adders 331 may be provided for each additional set of buffers 351.

The image processor 32 may also include a scaler 34. The scaler 34 may scale an output of the logical framebuffer 36 to a resolution of image frame data outputted to the display. For example, in some instances, scaler 34 may be used because a resolution of the logical framebuffer 36 may be greater than or equal to a resolution of the image frame data outputted to the first display 37. The scaler 34 may also be used in situations where the resolution of the logical framebuffer 36 is greater than or equal to a resolution of the buffers 1 to N in buffer set 35. The scaler 34 may also be used when the resolution of the logical framebuffer 36 is greater than the resolution of both the buffers 1 to N in buffer set 35 and the image frame data outputted to the first display 37.

The scaler 34 may downscale an output of the logical framebuffer 36 to a lower resolution of the buffers 1 to N in buffer set 35 and the adder 33 may then replace the outputted pixels based on the downscaled output from the scaler 34. Additional scalers 341 may be provide for scaling the output of the logical framebuffer 36 and/or image frame data in each additional buffer set 351 to the resolution of the buffer set 351 or a display 371 associated with the buffer set 351.

The image processor 32 may also include a hardware mirror 38 for mirroring the outputted oldest image frame data to a second display 371 operating a same resolution as the first display 37.

Figure 5:
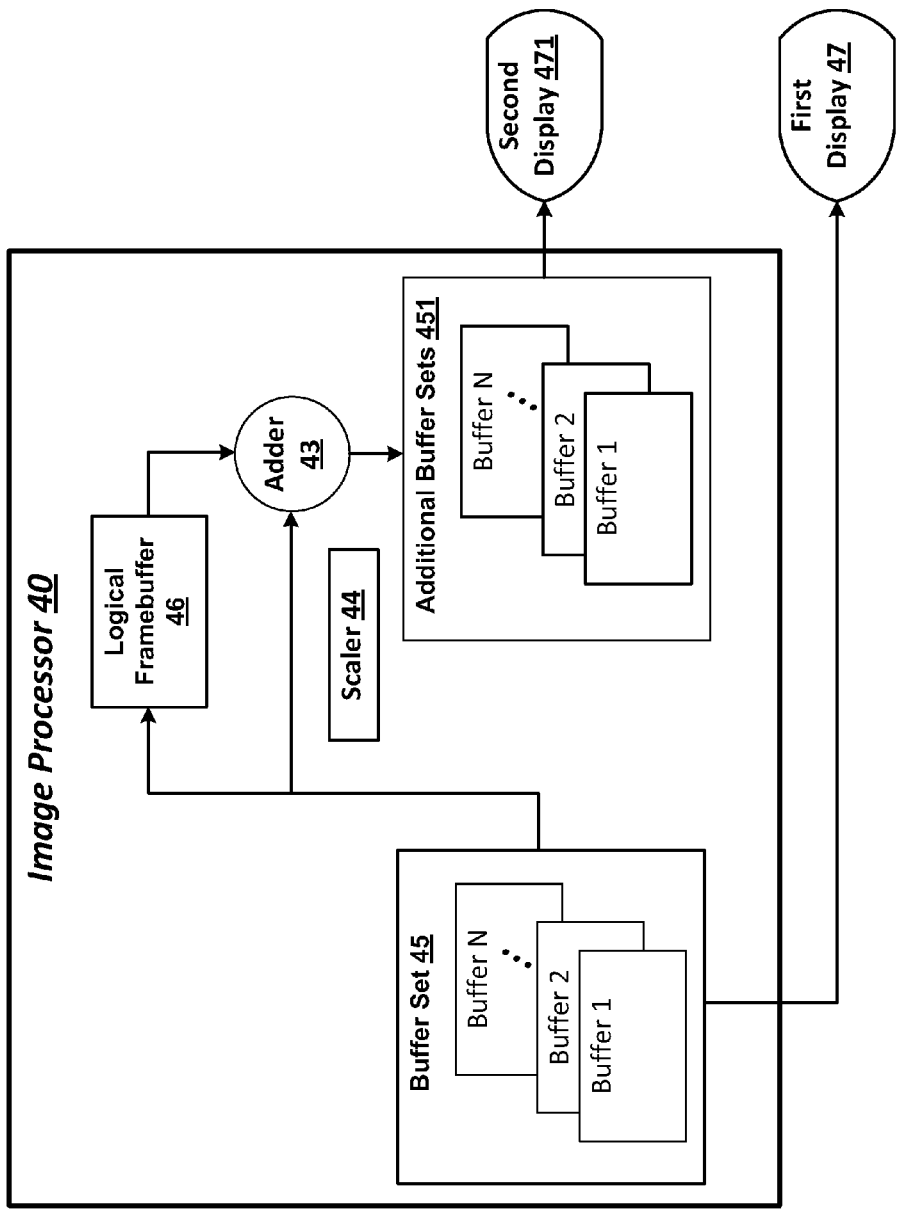
FIG. 5 shows a second exemplary image display system in an embodiment of the invention.

FIG. 5 shows a second exemplary image display system 49 that includes an image processor 40 and one or more display devices 47 and/or 471. The image processor 40 may include at least two sets of buffers 45 and 451. Each set of buffers 45 and 451 may store similar sequential image frame data at different resolutions. A first of the buffers 1 to N in each set may store most recent image frame data and a last of the buffers 1 to N in each set may store oldest image frame data outputted to a respective display 47 and 471.

The logical framebuffer 46 may compare two most recent sequential image frames in the first set 45 of buffers and may output pixels having changed values between the two image frames in the first set 45 of buffers. An adder 43 may replace the outputted pixels in the non-most recent image frame data stored in at least one of the second set of buffers with corresponding pixel values from the most recent image frame data. The adder 43 may replace these pixels before the stored non-most recent image frame data is outputted to the second display 471.

The image processor 40 may also include a scaler 44 for scaling an output of the logical framebuffer 46 from a resolution of the first set 45 of buffers to a resolution of the second set 451 of buffers. The adder 43 may then replace the outputted pixels based on the scaled output at the resolution of the second set 451 of buffers.

In other situations, additional sets of buffers may be included in the image processor 40 to enable the image processor 40 to supply display data to more than two displays at different resolutions. In these situations, the image processor 40 may include at least one additional set of buffers in addition to the first set 45 and the second set 451 of buffers. The image processor 40 may also include at least one scaler 44 for scaling an output of the logical framebuffer 46 from a resolution of the first set 45 of buffers to each resolution of the at least one additional set of buffers. The image processor 40 may also include at least one adder 43 for replacing the outputted pixels in at least one of non-most recent image frame data store in the at least one additional set of buffers with corresponding pixel values from the most recent image frame data.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although FIGS. 3 and 4 show one and/or two buffers set 31 and 311, in other embodiments, different numbers of buffer sets may be used to support a different number of displays operating at different resolutions.

We claim:

1. An image processor comprising:
a plurality of buffers each storing sequential image frame data at a first resolution;
a logical framebuffer to compare image frame data at a second resolution higher than the first resolution and identify changed pixel areas between each of an older, a newer, and a newest frames;
a scaler to scale a changed pixel area in the newest frame from the second resolution to the first resolution; and
an adder for replacing the changed pixel areas in the older image frame at the first resolution with a corresponding changed pixel area in the newer image frame at the first resolution and the corresponding changed pixel area in the newest image frame scales to the first resolution.

2. The image processor of claim 1, wherein the older and the newer frames are stored in the buffers at the first resolution and the adder replaces the changed pixel areas in the older frame to replace the older frame with the newest frame.

3. The image processor of claim 2, wherein the logical framebuffer stores a copy of the older, the newer, and the newest frames at the second resolution.

4. The image processor of claim 1, further comprising at least two sets of buffers, each set of buffers storing sequential image frame data at different resolutions less than or equal to the second resolution.

5. The image processor of claim 4, wherein the scaler scales the changed pixel area in the newest frame from the second resolution to each of the different respective resolutions that are less than the second resolution and the adder replaces the changed pixel areas in the older image frames at each of the different respective resolutions with corresponding changed pixel areas in the newer image frames at each of the different respective resolutions.

6. The image processor of claim 5, further comprising a plurality of scalers, each scaling the changed pixel area in the newest frame from the second resolution to a respective one of the different resolutions.

7. The image processor of claim 1, further comprising:
a hardware mirror for mirroring outputted image frame data to a second display operating a same resolution as a first display, wherein the image processor sequentially outputs buffered image frame data.

8. The image processor of claim 1, further comprising:
at least two sets of the plurality of buffers, each set of the buffers storing image frame data at a unique resolution;
a scaler for each set of the buffers, each scaler scaling an output of the logical framebuffer to the unique resolution of its respective set of buffers; and
an adder for each set of the buffers.

9. The image processor of claim 8, wherein each set of buffers includes at least three buffers.

10. An image processor comprising:
a first set and a second set of buffers each storing sequential image frame data at respective first and second resolutions;
a logical framebuffer to compare image frame data at a third resolution and identify changed pixel areas between each of an older, a newer, and a newest frames;
a first scaler to scale a changed pixel area in the newest frame from the third resolution to the first resolution;

a second scaler to scale a changed pixel area in the newest frame from the third resolution to the second resolution when the second resolution is not equal to the third resolution;

a first adder to replace the changed pixel areas in the older image frame at the first resolution with a corresponding changed pixel area in the newer image frame at the first resolution and the corresponding changed pixel area in the newest image frame scaled to the first resolution; and a second adder to replace the changed pixel areas in the older image frame at the second resolution with a corresponding changed pixel area in the newer image frame at the second resolution and the corresponding changed pixel area in the newest image frame scaled to the second resolution when the second resolution is not equal the third resolution.

11. The image processor of claim 10, wherein the first resolution is less than the second resolution, which is less than the third resolution.

12. The image processor of claim 10, wherein when the second resolution is equal to the third resolution, the second adder replaces the changed pixel areas in the older image frame at the second resolution with the corresponding changed pixel area in the newer image frame at the second resolution and the corresponding changed pixel area in the newest image frame at the second resolution.

13. The image processor of claim 10, further comprising:
at least one additional set of buffers in addition to the first set and the second set of buffers;
at least one scaler to respectively scale a changed pixel area in the newest frame to a resolution of each of the at least one additional set of buffers; and
at least one adder to replace the changed pixel areas in the older image frame at the resolution of each of the at least one additional set of buffers with the corresponding changed pixel area in the newer image frame at the resolution of each of the at least one additional set of buffers and the corresponding changed pixel area in the newest image frame scaled to the resolution of each of the at least one additional set of buffers.

14. A method for updating buffered image frame data comprising:
identifying a first image frame stored at first resolution in one of a plurality of buffers to be updated;
comparing the identified first image frame at a second resolution to a second image frame to be buffered to identify changed pixel areas between the first and second frames;
comparing the changed pixel areas in the second image frame to corresponding pixel areas of a third image frame at the second resolution to identify similar and different pixel areas;
copying, at the first resolution, the identified similar pixel areas from the third image frame to the first image frame;
scaling the identified different pixel areas from the second image frame from the second resolution to the first resolution; and
copying, at the first resolution, the scaled identified different pixel areas from the second image frame to the first image frame.

15. The method of claim 14, wherein the first resolution is lower than the second resolution.

16. The method of claim 14, wherein the first resolution is equal to the second resolution.

17. The method of claim 14, wherein the first image frame corresponds to an oldest buffered image frame and the third image frame corresponds to a most recently buffered image frame.

18. The method of claim 14 wherein
the plurality of buffers store sequential image frames,
the first image frame corresponds to an oldest image frame in the sequence that is stored in the buffers;
the second image frame corresponds to an image frame that is next in the sequence to be stored in the buffers; and
the third image frame corresponds to an image frame in the sequence that was most recently stored in the buffers and immediately precedes the second image frame in the sequence.

19. The method of claim 14, wherein each of the image frames are stored in the buffers at the first resolution and are stored in a logical framebuffer at the second resolution.

20. An image display system comprising:
a display device;
a plurality of buffers each storing sequential image frame data at a first resolution;
a logical framebuffer to compare image frame data at a second resolution higher than the first resolution and identify changed pixel areas between each of an older, a newer, and a newest frames;
a scaler to scale a changed pixel area in the newest frame from the second resolution to the first resolution;
an adder to replace the changed pixel areas in the older image frame at the first resolution with a corresponding changed pixel area in the newer image frame at the first resolution and the corresponding changed pixel area in the newest image frame scales to the first resolution; and
an output port for outputting image frame data stored in the buffers to the display device at the first resolution.

* * * * *